United States Patent
McGibney

(10) Patent No.: US 11,356,775 B2
(45) Date of Patent: Jun. 7, 2022

(54) SYSTEM AND METHOD FOR EMBEDDING ADDITIONAL INFORMATION IN A SOUND MASK NOISE SIGNAL

(71) Applicant: Nureva, Inc., Calgary (CA)

(72) Inventor: Grant Howard McGibney, Calgary (CA)

(73) Assignee: NUREVA, INC.

( * ) Notice: Subject to any disclaimer, the term of this patent is extended or adjusted under 35 U.S.C. 154(b) by 0 days.

(21) Appl. No.: 17/106,295

(22) Filed: Nov. 30, 2020

(65) Prior Publication Data

US 2021/0152932 A1    May 20, 2021

Related U.S. Application Data

(63) Continuation of application No. 16/700,333, filed on Dec. 2, 2019, now Pat. No. 10,856,079, which is a (Continued)

(51) Int. Cl.
*H04R 3/02* (2006.01)
*H04R 3/00* (2006.01)
(Continued)

(52) U.S. Cl.
CPC .............. *H04R 3/02* (2013.01); *G06F 3/162* (2013.01); *G06F 3/165* (2013.01); *H04R 3/005* (2013.01);
(Continued)

(58) Field of Classification Search
USPC .............. 381/56, 73.1, 71.11, 94.1, 94.2, 95
See application file for complete search history.

(56) References Cited

U.S. PATENT DOCUMENTS

| | | |
|---|---|---|
| 4,914,706 A | 4/1990 | Krause |
| 5,187,692 A | 2/1993 | Haneda |
| (Continued) | | |

FOREIGN PATENT DOCUMENTS

| | | |
|---|---|---|
| CN | 101354885 B | 1/2009 |
| CN | 201185081 Y | 1/2009 |
| (Continued) | | |

OTHER PUBLICATIONS

Machine-generated English Translation of Chinese Patent Document 201185081Y, with a publication date of Jan. 21, 2009.
(Continued)

*Primary Examiner* — Yosef K Laekemariam
(74) *Attorney, Agent, or Firm* — Katten Muchin Rosenman LLP

(57) ABSTRACT

A system and method for processing and enhancing utility of a sound mask noise signal, including generating, by a signal processor, the sound mask noise signal by modulating a noise signal with embedded additional information, outputting, by a plurality of audio speakers, sound signals comprising the sound mask noise signal with the embedded additional information, and receiving, by one or more microphones, the outputted sound signals comprising the sound mask noise signal, wherein an impulse response between each audio speaker and each microphone is measured in real time based on the embedded additional information.

17 Claims, 7 Drawing Sheets

Related U.S. Application Data continuation of application No. 15/574,134, filed as application No. PCT/CA2016/000146 on May 13, 2016, now Pat. No. 10,499,151.

(60) Provisional application No. 62/162,091, filed on May 15, 2015.

(51) Int. Cl.
*H04R 5/027* (2006.01)
*H04S 3/00* (2006.01)
*H04S 7/00* (2006.01)
*G06F 3/16* (2006.01)
*H04R 5/02* (2006.01)

(52) U.S. Cl.
CPC .............. *H04R 5/027* (2013.01); *H04S 3/00* (2013.01); *H04S 7/305* (2013.01); *H04R 5/02* (2013.01); *H04R 2227/003* (2013.01); *H04S 2400/15* (2013.01)

(56) References Cited

U.S. PATENT DOCUMENTS

| | | | |
|---|---|---|---|
| 5,453,943 A | 9/1995 | Magliozzi | |
| 5,781,640 A | 7/1998 | Nicolino, Jr. | |
| 6,061,793 A | 5/2000 | Tewfik et al. | |
| 6,208,735 B1 | 3/2001 | Cox et al. | |
| 6,584,138 B1 | 6/2003 | Neubauer et al. | |
| 6,650,762 B2 | 11/2003 | Gibson et al. | |
| 6,674,876 B1 | 1/2004 | Hannigan et al. | |
| 6,748,086 B1 | 6/2004 | Venkatesh et al. | |
| 6,760,449 B1 | 7/2004 | Matsuo | |
| 6,937,980 B2 | 8/2005 | Krasny et al. | |
| 6,996,521 B2 | 2/2006 | Iliev et al. | |
| 7,526,078 B2 | 4/2009 | Rodman et al. | |
| 8,212,854 B2 | 7/2012 | Marton et al. | |
| 8,223,985 B2 | 7/2012 | Loud | |
| 8,477,958 B2 | 7/2013 | Moeller et al. | |
| 8,660,581 B2 * | 2/2014 | Davis ................. | H04R 29/007 455/456.3 |
| 8,666,086 B2 | 3/2014 | Moeller et al. | |
| 8,804,984 B2 | 8/2014 | Lovitt | |
| 9,171,551 B2 | 10/2015 | Tzirkel-Hancock et al. | |
| 2002/0064149 A1 | 5/2002 | Elliott et al. | |
| 2002/0161573 A1 | 10/2002 | Yoshida | |
| 2003/0002687 A1 | 1/2003 | Raptopoulos et al. | |
| 2003/0103632 A1 | 6/2003 | Goubran et al. | |
| 2003/0107478 A1 | 6/2003 | Hendricks et al. | |
| 2004/0068399 A1 | 4/2004 | Ding | |
| 2005/0207592 A1 | 9/2005 | Sporer et al. | |
| 2006/0109983 A1 | 5/2006 | Young et al. | |
| 2008/0147394 A1 | 6/2008 | Dames et al. | |
| 2008/0215333 A1 | 9/2008 | Tewfik et al. | |
| 2010/0135118 A1 | 6/2010 | Van Leest et al. | |
| 2012/0288124 A1 * | 11/2012 | Fejzo ..................... | H04S 7/301 381/303 |
| 2014/0270216 A1 | 9/2014 | Tsilfidis | |
| 2016/0315870 A1 | 10/2016 | Akl-Chedid et al. | |
| 2017/0243138 A1 | 8/2017 | Dzierwa et al. | |
| 2018/0343224 A1 | 11/2018 | Lord | |

FOREIGN PATENT DOCUMENTS

| | | |
|---|---|---|
| CN | 102148034 A | 8/2011 |
| CN | 102237093 B | 11/2011 |
| EP | 1 514 450 | 6/2004 |
| EP | 1 722 545 A1 | 11/2006 |
| EP | 2 063 419 A1 | 5/2009 |
| EP | 2 375 779 A2 | 10/2011 |
| JP | 2008233672 A | 10/2008 |
| WO | 2014/151857 A1 | 9/2014 |

OTHER PUBLICATIONS

International Search Report for International Application No. PCT/CA2016/000146, dated Sep. 9, 2016.
Extended European Search Report for European Patent Application No. 16795576.4 dated Mar. 13, 2018.
Communication for European Patent Application No. 16795576.4 dated Feb. 4, 2019.
Non-Final Rejection dated Jan. 17, 2020, from U.S. Appl. No. 16/700,333, 17 sheets.
Notice of Allowance dated Jul. 27, 2020, from U.S. Appl. No. 16/700,333, 42 sheets.
Notice of Allowance dated Jul. 26, 2019, from U.S. Appl. No. 15/574,134, 33 sheets.
Notice of Allowance dated May 8, 2019, from U.S. Appl. No. 15/574,134, 28 sheets.
Final Rejection dated Nov. 5, 2018, from U.S. Appl. No. 15/574,134, 16 sheets.
Non-Final Rejection dated Apr. 3, 2018, from U.S. Appl. No. 15/574,134, 33 sheets.
Advisory Action dated Mar. 8, 2019, from U.S. Appl. No. 15/574,134, 3 sheets.

* cited by examiner

Fig. 1 (100)
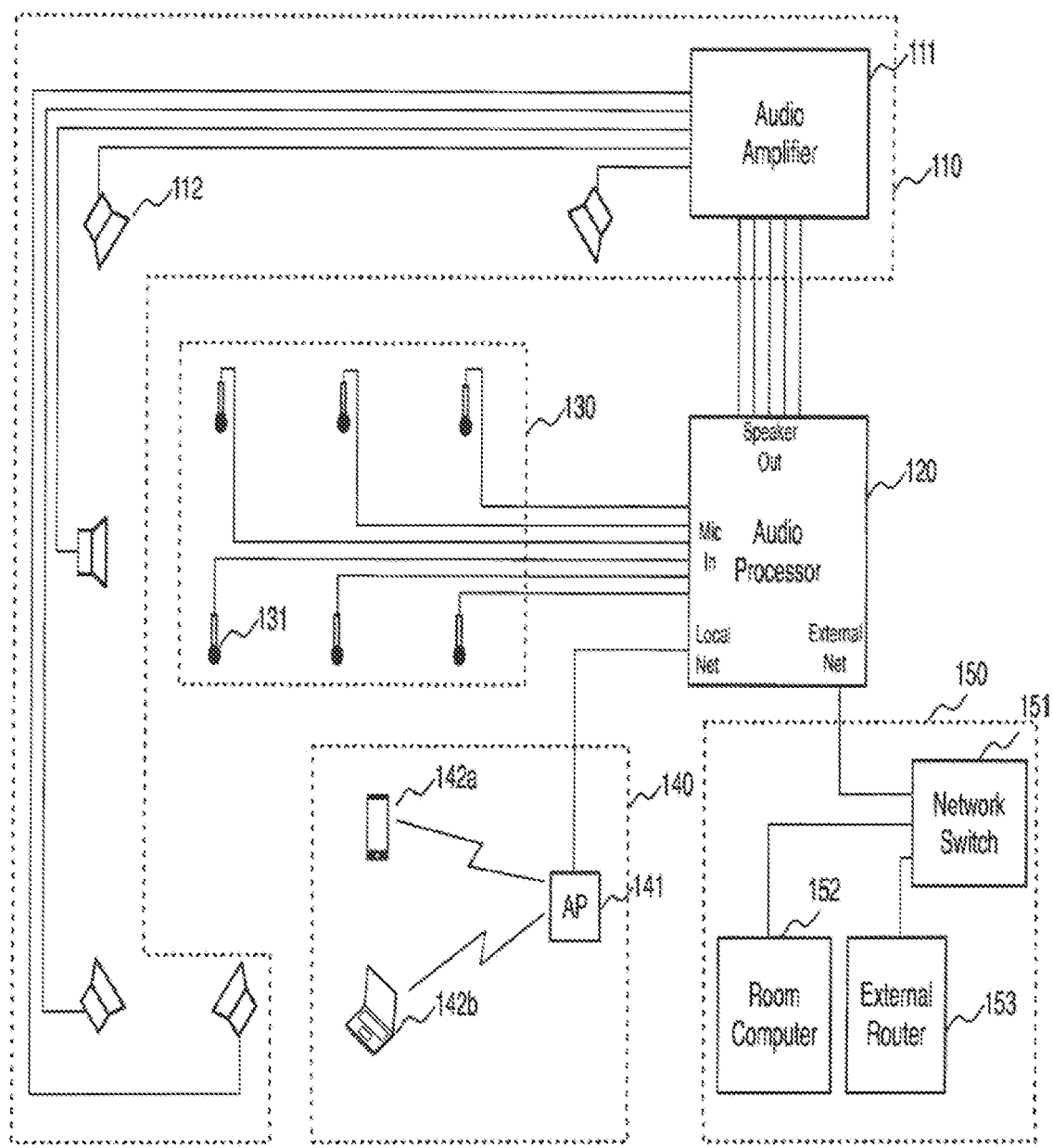

Fig. 2 (120)
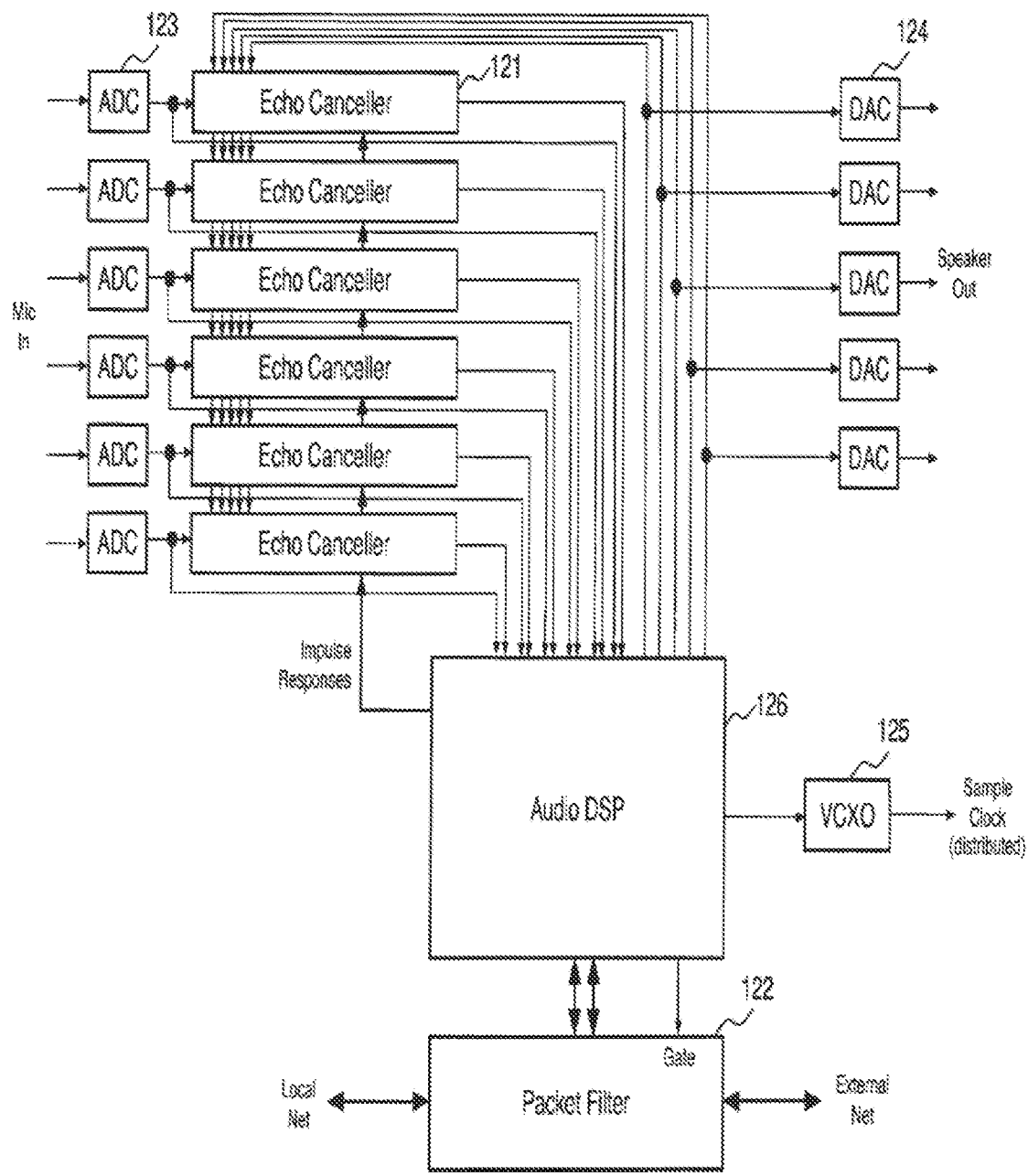

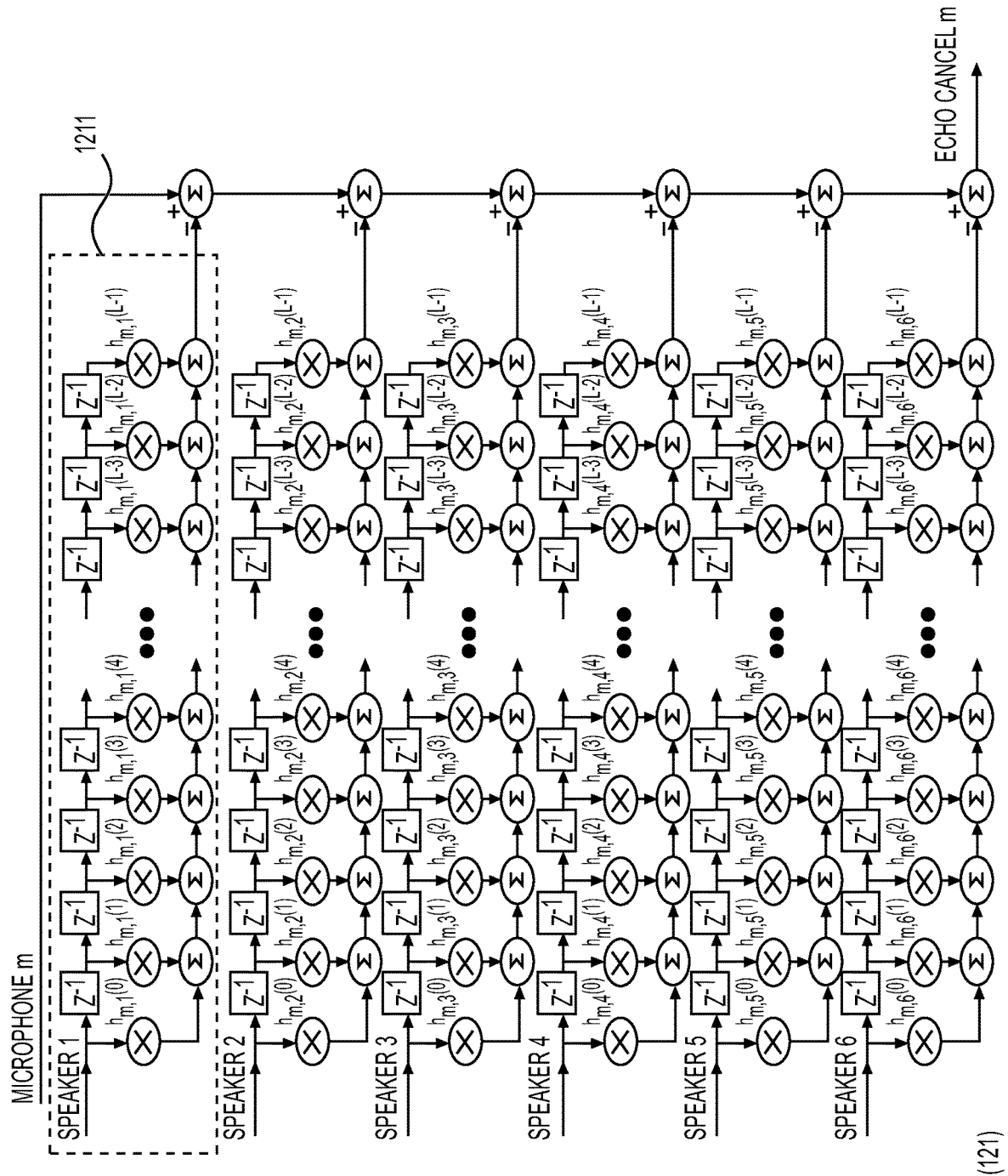
FIG. 3 (121)

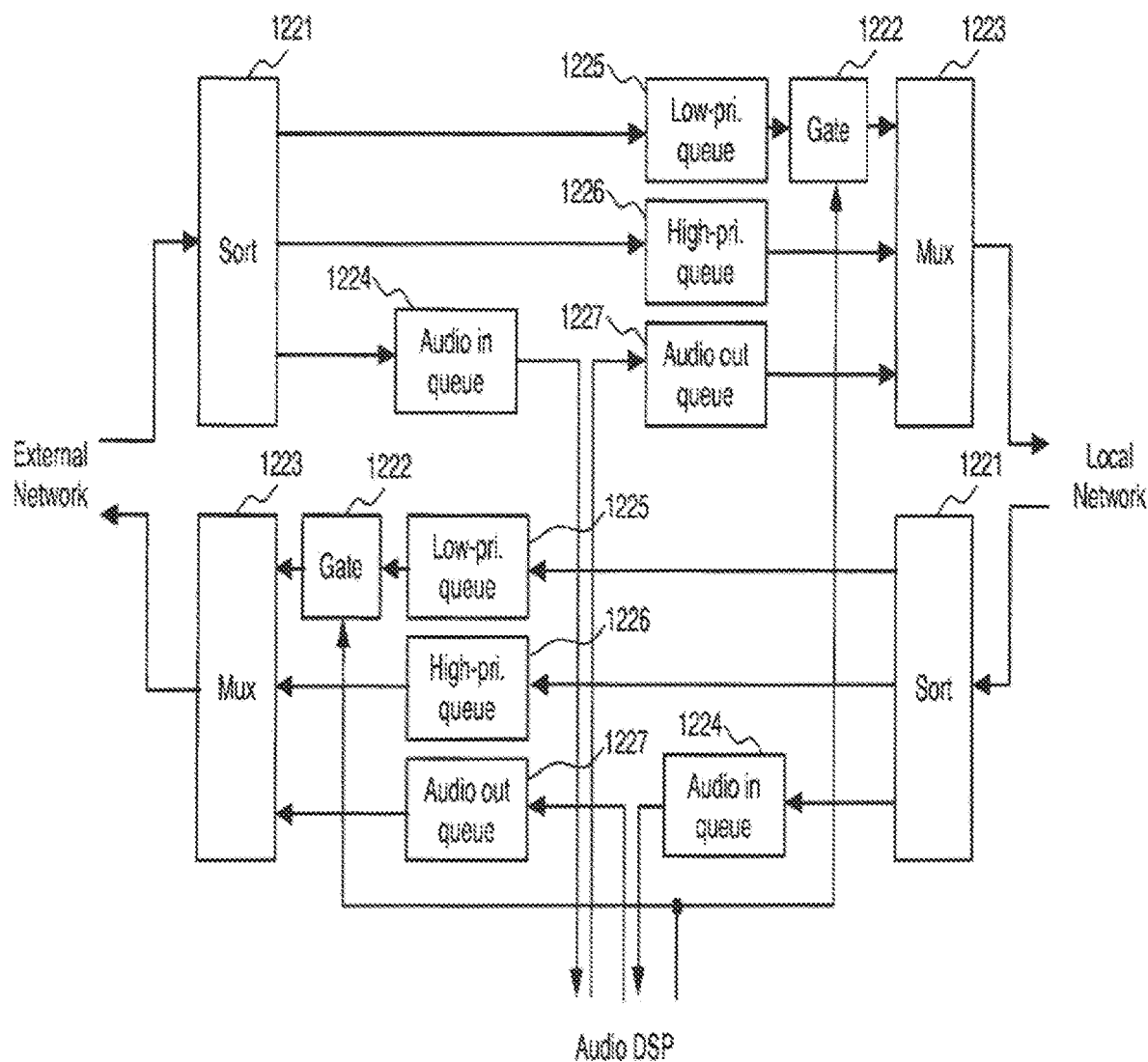

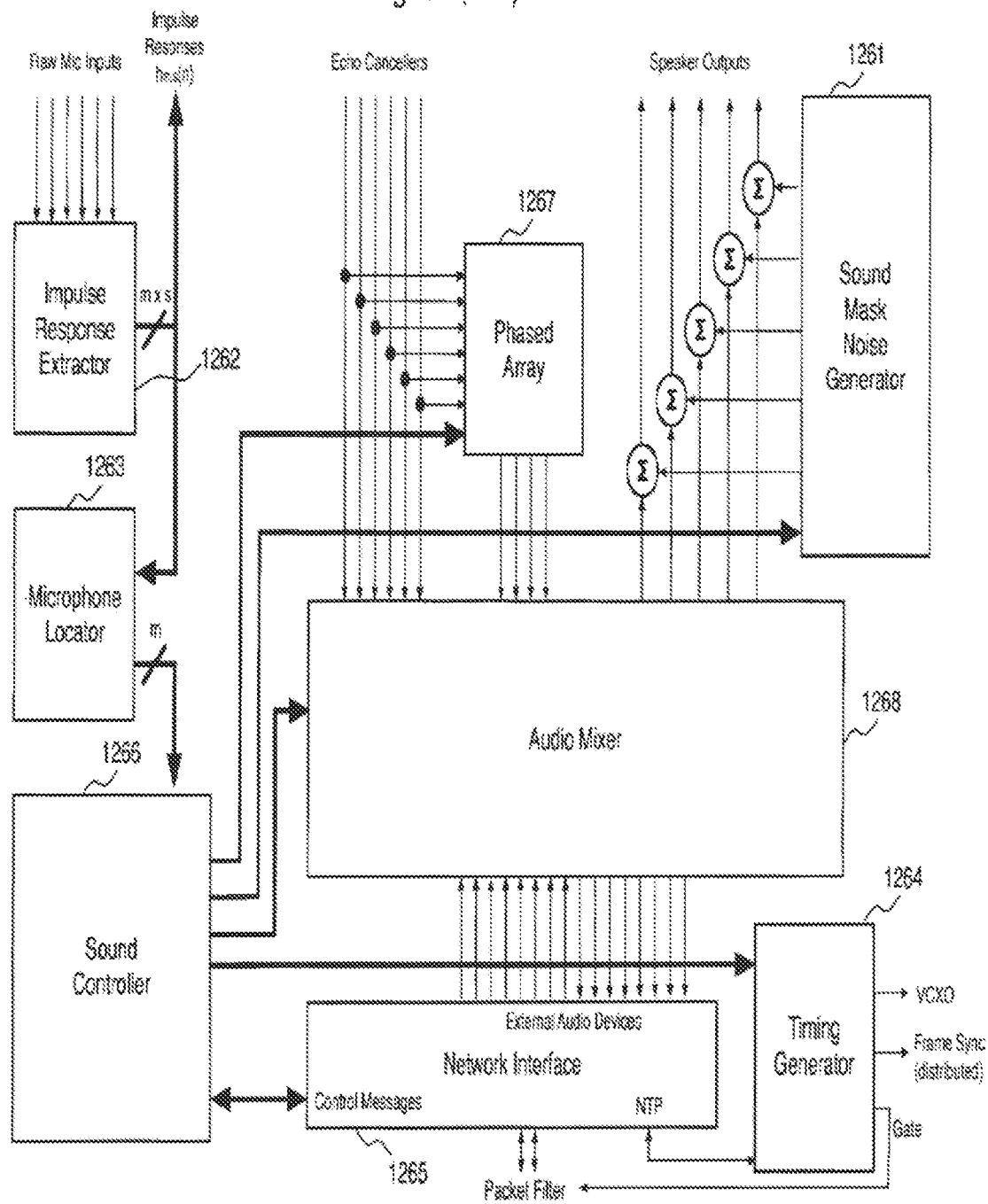
Fig. 5 (126)

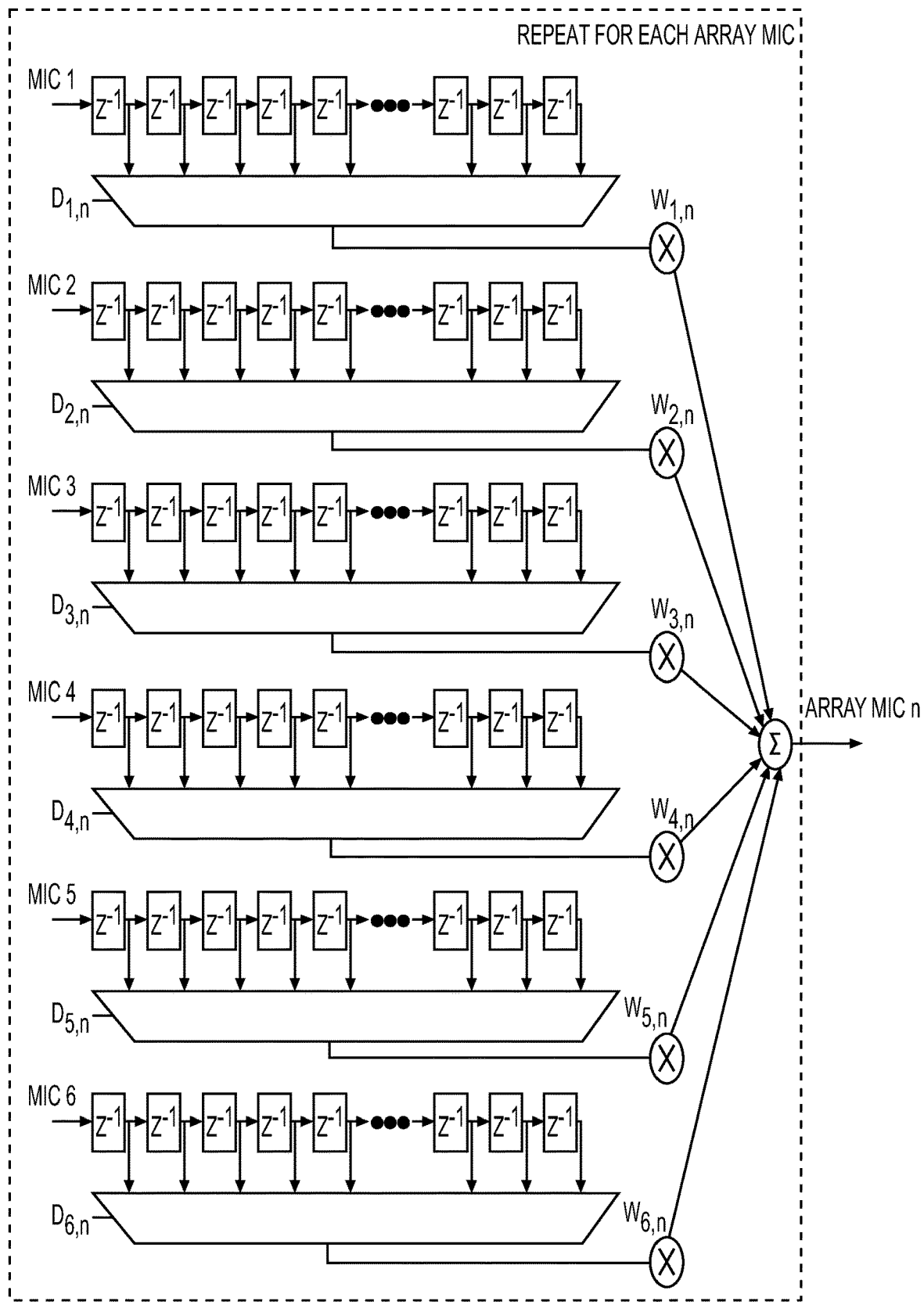
FIG. 6 (1267)

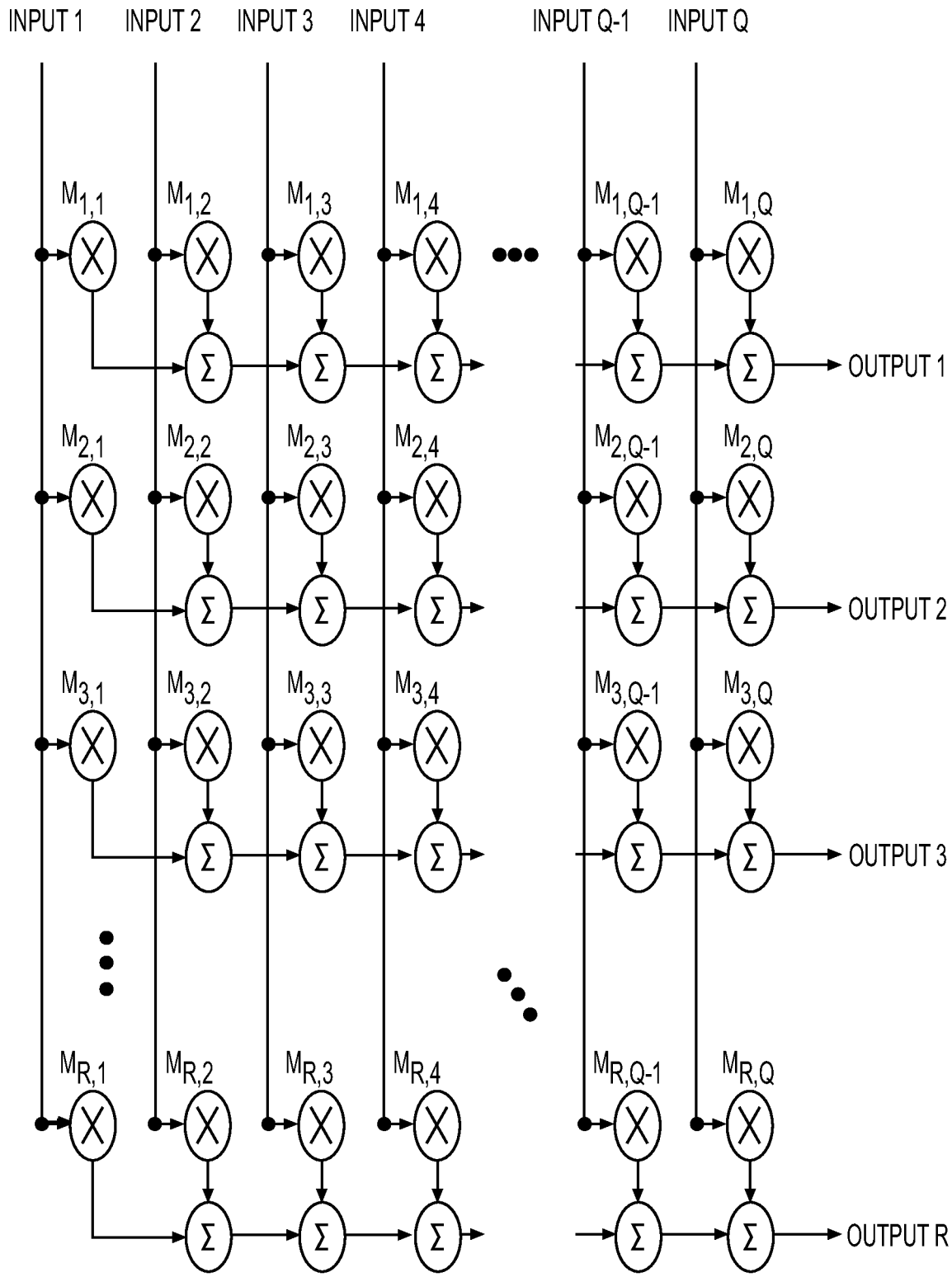
*FIG. 7* (1268)

SYSTEM AND METHOD FOR EMBEDDING ADDITIONAL INFORMATION IN A SOUND MASK NOISE SIGNAL

CROSS-REFERENCE TO RELATED APPLICATIONS

This application is a continuation of U.S. patent application Ser. No. 16/700,333, filed Dec. 2, 2019, which is a continuation of U.S. patent application Ser. No. 15/574,134, filed Nov. 14, 2017, now U.S. Pat. No. 10,499,151 issued Dec. 3, 2019, which is a 371 of International PCT/CA2016/000146, filed May 13, 2016, which claims priority from U.S. Patent Appln. No. 62/162,091 filed May 15, 2015 the contents of all incorporated herein by reference.

This application is based upon and claims the benefit of priority of the prior U.S. Provisional Application No. 52/162,091, filed on May 15, 2015, the entire contents of which are incorporated herein by reference.

BACKGROUND OF THE INVENTION

Field of the Invention

The present invention generally relates to delivering a high quality bidirectional audio experience in a multi-user room and more specifically to systems and methods for real-time scalable impulse response generation, sound masking and measurement to implement dynamic microphone array adaption and position determination while embedding a flexible data communication channel.

Description of Related Art

Establishing high quality audio and video bidirectional performance has always been a challenge for business applications. Supporting a plurality of users in a variety of situations and seating positions has proven to be a difficult problem to solve. In addition to the performance requirements, the system needs to deal with environmental, architectural and building issues, such as, but not limited to, noise from heating, ventilation, air conditioning, external noise, and irregular shape and various sizes of multi-user rooms. The current art solves the problems through the use of custom solutions and complex system integration, which requires the use of professional audio and video engineers, architectural, information technology, and other professional support services making for costly uniquely designed solutions that do not typically scale or adapt well without introducing a redesign phase.

Currently multi-user rooms utilize many forms of audio/video conference systems to help obtain the best audio performance using a microphone system for sound pick up and speakers for sound distribution to provide the required bi-directional audio quality. Current implementations integrate individual solutions that usually are not tightly integrated to obtain the benefit of sound masks, echo cancellation, and microphone arrays, which usually means no benefit of a combined signal to accomplish a holistic system approach that is adaptable in real-time to changing systems parameters, such as adding a microphone by determining its position and extending the array, and dynamic echo cancellation, among other benefits.

By the very nature of the complex requirements a system that meet all of the needs and expectations of the users is usually designed for a specific room and application. This can be a complex and costly undertaking resulting in installed solutions that usually are not adaptable easily for new rooms and or environments, requiring design changes and calibration tuning. Typically, these types of changes require the room to be put into maintenance mode to adjust for changes to the microphone array and speaker setup and locations. When changes occur that impact room properties, such as the sound propagation delay time between microphones and speakers, previous calibrations are effectively invalidated—for example, if a room becomes more reflective and or damped.

In the prior art, systems deploy microphones that are located in close proximity to participants' typical locations and/or they employ static microphone arrays. Both such systems are designed for audio sound pick up with the least noise in the form of signal to noise ratio and best voice quality—thus giving an acceptable conference experience. But both such systems bring their own unique set of problems. Using closely located microphones creates clutter and necessitates complex installations, creating the need to run extra cabling and hardware as the persons may not be seated or standing in a place that is optimal for microphone placement and hookup. A static microphone array cannot be adjusted for extra microphones and is preconfigured with design assumptions that may not be valid or may change through usage. This can limit the array's effectiveness, requiring additional microphones to be added to the system that are parallel to the array but not a part of the array—so the beam focusing, sound and noise management properties are greatly diminished. Complex static microphone arrays need to be designed and tuned to a particular application, so they are not suitable for scaling the array. To install a microphone array in a space, the array dimensions and parameters need to be determined, designed and installed to exacting specifications.

Current implementations of in-room audio system usually deploy a specific sound mask for noise control by raising the noise floor in a benign manner so that unwanted noises are masked. Sound masks by their very nature are typically random pink noise filtered and shaped audio signals that are designed and tailored to a specific room and environmental needs, such as, but not limited to, heating, ventilation, air conditioning, privacy, in-room hardware and ambient noise considerations. They need to be non-obtrusive and they need to be perceived as non-correlated audio signals by the ear so they do not draw attention to the sound masks themselves. But this very property makes them unsuitable for relocating microphones and speakers due to the random non-correlated signal properties. Sound masks are usually engineered and installed to specific specifications and design criteria that take into account room idiosyncrasies, environmental noise conditions, and the business needs of the room. The room may have confidentiality concerns, multiple users, and uses with video and audio conference capabilities requiring a properly setup sound masking solution. The typical prior art solutions are a single purpose signal and as such are limited to a single application purpose.

In the prior art, impulse responses are used in establishing room properties, microphone and speaker relationships, and placements in relative and absolute positions. With the relationships known, echo cancellation can be achieved by subtracting the un-desired signal from the speakers when picked up by the microphones, to remove feedback into the system which could cause large oscillations and distortions that can stress a system. The problem with signals used to obtain impulse responses, such as, but not limited to, claps and chirps, is that they are not easy to listen to and they can be correlated by the ear to form patterns. As a consequence the room setup and calibration needs to be performed when the room is offline and out of commission. If anything in the setup changes, such as, but not limited to, changes in systems, room structural dimensions, furniture and content changes, as well as acoustic properties whether they are reflective or absorptive in nature, the calibrations and setup need to be redone. This characteristic makes these signals ill-suited to live, in-person meeting, conference, and presentation situations, in a room with an auto-calibration capable functionality to adapt to changing room conditions and additional hardware, such as, but not limited to, microphones.

U.S. Pat. No. 4,914,706A describes a random noise generator with multiple outputs that can be tailored through custom low pass filters.

U.S. Pat. No. 8,223,985B2 describes a method for masking pure tones within a sound mask. Pure tones are not suitable as an impulse signal because when there are correlations, the result is sine waves and not an impulse signal.

U.S. Patent Application Publication No. 2003/0103632A1 describes a method to sample undesired sound and generate white noise tailored to mask the undesired sound.

U.S. Pat. No. 7,526,078B2 describes a method for combining a modulated subcarrier onto an audio signal of a conference.

U.S. Pat. No. 8,804,984B2 describes spectrally shaping audio signal(s) for audio mixing.

U.S. Pat. No. 8,666,086B2 describes a technique for monitoring and/or controlling a sound masking system from a computer aided design drawing.

U.S. Patent Application Publication No. 2008/0147394A1 describes a speech processing system for improving a user's experience with a speech-enabled system using artificially generated white noise.

U.S. Patent Application Publication No. 2003/0107478A1 describes an architectural sound enhancement system for installation in a space having a suspended ceiling to provide integrated masking, background, and paging functions.

U.S. Pat. No. 8,477,958B2 describes a masking system for shaping the ambient noise level in a physical environment.

U.S. Pat. No. 5,781,640A describes a system for suppressing the effects of undesirable noise from an annoying noise source that contains a plurality of transformation sounds which, when combined with the noise, form a sound selection process.

U.S. Pat. No. 6,996,521B2 describes a method for embedding a data signal in an audio signal and determining the data embedded signal.

U.S. Patent Application Publication No. 2006/0109983A1 describes a method and corresponding apparatus of adaptively masking signals in an efficient effective manner, including providing a signal; generating a masking signal that adaptively corresponds to the signal; and inserting the masking signal into a channel corresponding to the signal at a location proximate to the source of the signal to facilitate masking the signal in the channel.

U.S. Patent Application Publication No. 2004/0068399A1 describes a technique for communicating an audio stream. A perceptual mask is estimated for an audio stream, based on the perceptual threshold of the human auditory system. A hidden sub-signal, or to concurrent services that can be accessed while the audio stream is being transmitted.

U.S. Pat. No. 6,208,735B1 describes digital watermarking of audio, image, video or multimedia data by inserting the watermark into perceptually significant components of the frequency spectral image.

U.S. Pat. No. 6,650,762B2 describes a new approach to data embedding within ITU G.722 and ITU G.711 based upon the method of types and universal classification.

U.S. Pat. No. 6,584,138B1 describes a coding method and a coder for introducing a non-audible data into an audio signal, which is first transformed to a spectral range and the signal is determined.

Chinese Patent No. CN102237093B describes an echo hiding method based on forward and backward echo kernels.

Chinese Patent Application Publication CN102148034A describes an echo hiding based watermark embedding and extracting method belonging to the technical field of information safety.

U.S. Patent Application Publication No. 2003/0002687A1 describes an apparatus and related method for acoustically improving an environment.

U.S. Pat. No. 8,212,854B2 describes a method and system with means for preventing unauthorized monitoring of a local conference room in which a local conferencing system is located comprising generation of a deterministic sound signal on a first loudspeaker connected to, or integrated in the conferencing system, detecting the deterministic signal picked up by a microphone connected to, or integrated in the conferencing system, and transferring the conference system into a security mode, if the deterministic.

Chinese Patent No. CN101354885B describes an active control of an unwanted noise signal that has an amplitude and/or frequency such that it is masked for a human listener at the listening site by the unwanted noise signal present at the listening site in order to adapt for the time-varying secondary path in a real time manner such that a user doesn't feel disturbed by an additional artificial noise source.

Japanese Patent Application Publication No. JP2008233672A describes a technique for generating a masking sound having sound characteristics most suitable for masking sound characteristic of a sound to be masked.

U.S. Pat. No. 6,674,876B1 describes methods and systems for time-frequency domain watermarking of media signals, such as audio and video signals.

U.S. Pat. No. 6,061,793A describes a technique for hiding of data, including watermarks, in human-perceptible sounds, that is, audio host data.

U.S. Patent Application Publication No. 2008/0215333A1 describes a method of embedding data into an audio signal, providing a data sequence for embedding in the audio signal and computing masking thresholds for the audio signal from a frequency domain transform of the audio signal.

European Patent Application Publication. No. EP1722545A1 describes a method for reducing the total acoustic echo cancellation convergence time for all look directions in a microphone array based full-duplex system.

Chinese Utility Model No. CN201185081Y describes an echo eliminator that can eliminate different echoes, which comprises a parameter adjustable subtracter that can adjust the subtract time parameter according to the time difference of the echoes so as to eliminate the corresponding echoes corresponding to the inputted mixed audio, and a non-linear processing circuit that is connected with the parameter adjustable subtracter and is used for performing the non-linear processing of the audio signal with the echoes being eliminated that is outputted by the subtracter so as to reduce the non-linear distortion factor of the audio signal, so that different echoes that are produced at different video conference fields can be effectively removed, thereby effectively improving the quality of the audio signal.

U.S. Pat. No. 6,937,980B2 describes audio processing providing enhanced speech recognition. Audio input is received at a plurality of microphones. The multi-channel audio signal from the microphones may be processed by a beamforming network to generate a single-channel enhanced audio signal, on which voice activity is detected. Audio signals from the microphones are additionally processed by an adaptable noise cancellation filter having variable filter coefficients to generate a noise-suppressed audio signal.

U.S. Pat. No. 6,748,086B1 describes a cabin communication system for improving clarity of a microphone array including a first voice primarily in a first direction and for converting the spoken microphone, positioned at a second location within the cabin, for receiving the spoken voice into a second audio signal.

U.S. Pat. No. 9,171,551B2 describes a unified microphone pre-processing system that includes a plurality of microphones arranged within a vehicle passenger compartment, a processing circuit or system configured to receive signals from one or more of the plurality of microphones, and the processing circuit configured to enhance the received signals for use by at least two of a telephony processing application, an automatic speech recognition processing application, and a noise cancellation processing application.

U.S. Pat. No. 5,453,943A describes an "adaptive synchrophaser" for modifying the phase angle relationship between aircraft propellers to reduce cabin noise and/or vibration.

U.S. Pat. No. 6,760,449B1 describes a microphone array system that includes a plurality of microphones and a sound signal processing part. The microphones are arranged in such a manner that at least three microphones are arranged in a first direction to form a microphone row, at least three rows of the microphones are arranged so that the microphone rows are not crossed each other so as to form a plane, and at least three layers of the planes are arranged three-dimensionally so that the planes are not crossed each other, so that the boundary conditions for the sound estimation at each plane of the planes constituting the three dimension can be obtained.

SUMMARY OF THE INVENTION

A limitation of existing systems is the inability to integrate a low bandwidth data channel into the existing benign sound mask signals, consequently, separate transmitters and devices are required to support this function, which could and are not limited to transmitting room ID parameters, speaker ID parameters, and other identifications and parameters that are useful for allowing the room and mobile system to adapt to the room in a manner such that the devices become an extension of the system providing an engaging experience.

Existing systems also do not allow a flexible and adaptable single purpose signal that can deliver real-time dynamic parameter echo cancellation, sound masking, and impulse response generation for in-room real-time speakers for microphone response correction, microphone detection and position determination. Consequently, current systems often require expensive engineering, designers and architects to be involved to design and engineer the system that is purpose built for the specific room and/or environment. This results in a system that requires extensive setup and that cannot adapt or scale in real-time.

In view of the above, it is an objective of the invention to provide a flexible and scalable system for a flexible microphone array that can then be used to focus the microphones on desired sounds and defocus the undesired sounds, while communicating on a multi-use low bandwidth data channel. Various approaches are describe herein for, among other things, obtaining an impulse response between speakers and microphones from a sound mask signal, and extracting low bandwidth data for managing room noise level sound and improving bi-directional audio performance with dynamically instantiated microphones arrays, which do not need to be positioned in close proximity to the speaking person or preconfigured to a static design implementation.

According to an embodiment of the invention, a sound mask is created and transmitted by the speakers from an impulse signal that has unique pseudo-random phase properties, allowing for dynamic and sealable hardware changes, such as, but not limited to, microphone location, number of microphones, and configuration changes to the system in real-time. This is accomplished by creating a unique speaker-specific pseudo-random phase-shifted wave, that has sound masking properties and is generated from an impulse response that is processed based on OFDM (Orthogonal Frequency Division Multiplexing) principals—typically applied to the Radio Frequency domain on, say, wireless networks, such as, but not limited to, wireless LAN (WLAN) radio interfaces IEEE 802.11a, g, n, ac and HIPERLAN/2—and adapted to the audio signal domain to transmit a sound mask like signal that has the unique properties to allow it to be converted back to an impulse response to allow in-room real-time measurement and calibrations.

The sound mask can then be deconstructed through post-processing to a mathematically perfect impulse response. Since the impulse response is happening in real-time and is repeated at a configurable cycle rate based on configurable room parameters, the impulse response can be utilized to implement dynamic individual speaker to microphone echo cancellation that can be adjusted as the room parameters change in absorptive and reflective properties.

In accordance with an embodiment of the invention, the real-time impulse response can be utilized to map out and maintain a dynamic microphone array. With known speaker locations, the propagation delay, which can be calculated in real-time, may be used to establish microphone locations in 3 dimensional space. Once the locations have been mapped in real-time, a dynamically adaptable microphone array can be established, allowing all the benefits of such an array to focus the microphones on desired sound and to take the focus away from undesired sound. Since the array is built dynamically and repeatedly on a consistent cycle rate, the system is not constrained to predefined configuration and physical design parameters, allowing the system to adapt to additional, removed, and repositioned microphones without degradation in performance or needing to redesign the system to handle scalability concerns. Additionally, the microphones can be placed optimally in the room to allow for the highest quality sound pickup and account for installation constraints.

In accordance with an embodiment of the invention, the sound mask signal can also be used to communicate additional low bandwidth information allowing room ID discovery and other setup and configuration parameters, which can be used by mobile devices and other smart devices to expand the user and system experience.

1. A system for processing audio to enhance utility of an audio signal comprising:

a processor configured to generate a sound mask noise signal and to modulate an ambient noise wave to embed additional information to the sound mask noise signal; and a plurality of audio speakers configured to output the sound mask noise signal with the modulated ambient noise wave.

2. The system of paragraph 1, further comprising:

one or more microphones each configured to receive the sound mask noise signal output from the plurality of audio speakers; and an echo canceller configured to receive a copy of an original sound wave output to each of the plurality of audio speakers, the received signals from the one or more microphones, and a measured impulse response between each audio speaker and each microphone to suppress undesirable sounds in the received signals.

The system of paragraph 2, further comprising:

a microphone locator configured to determine relative positions of the one or more microphones within a space by measuring time delays from each audio speaker to each microphone.

4. The system of paragraph 2, further comprising:

a network interface configured to communicate the received signals to one or more of a local network and an external network via data packets; and a packet filter that sorts and prioritizes packets from a packet stream between the local network and the external network, wherein the packet filter is further configured to prevent and delay transmission of lower priority packets in the packet stream for minimizing latency of the data packets of the received signals.

5. A system for processing audio to enhance utility of an audio signal comprising:

a plurality of audio speakers;

one or more microphones each configured to receive plural sound waves from the plurality of audio speakers; and a processor configured to align and enhance the received sound waves from the one or more microphones by determining and calibrating relative positions of the one or more microphones and the plurality of audio speakers, wherein the processor increases an amplitude of desirable sounds from disparate sources received by the one or more microphones.

6. The system of paragraph 5, further comprising:

an echo canceller configured to receive a copy of an original sound wave output to each of the plurality of audio speakers, received signals from the plurality of microphones, and a measured impulse response between each audio speaker and each microphone to suppress undesirable sounds in the received signals.

7. The system of paragraph 5, further comprising:

a network interface configured to communicate the received signals to one or more of a local network and an external network via data packets; and a packet filter that sorts and prioritizes packets from a packet stream between the local network and the external network, wherein the packet filter is further configured to prevent and delay transmission of lower priority packets in the packet stream for minimizing latency of the data packets of the received signals.

8. A system for processing audio to enhance utility of an audio signal comprising:

a plurality of audio speakers each configured to output an audio signal;

a processor configured to receive the audio signal from an ad hoc array of one or more microphones;

a microphone locator configured to enhance the audio signal by determining relative positions of the one or more microphones within a space by measuring time delays from the plurality of audio speakers to the one or more microphones;

a network interface configured to communicate the enhanced audio signal to one or more of a local network and an external network via data packets; and a packet filter that sorts and prioritizes packets from a packet stream between the local network and the external network, wherein the packet filter is further configured to prevent and delay transmission of lower priority packets in the packet stream for minimizing latency of the data packets of the enhanced audio signal.

BRIEF DESCRIPTION OF DRAWINGS

FIG. 1 is a perspective view of an audio system in accordance with an embodiment of the invention.

FIG. 2 is a detailed view of the audio processor shown in FIG. 1 in accordance with an embodiment of the present invention.

FIG. 3 is a detailed view of the echo canceller shown in FIG. 2.

FIG. 4 is a detailed view of the packet filter shown in FIG. 2.

FIG. 5 is a detailed view of the audio DSP shown in FIG. 2.

FIG. 6 is a detailed view of the phased array shown in FIG. 5.

FIG. 7 is a detailed view of the audio mixer shown in FIG. 5.

DETAILED DESCRIPTION OF THE PRESENTLY PREFERRED EXEMPLARY EMBODIMENTS

With reference to the drawings, a non-limiting illustrative embodiment will now be described.

FIG. 1 shows a system 100 wherein the system may include a room speaker system 110, audio processor 120, microphone array 130, a local network 140, and an external network 150.

Room speaker system 110 includes a multi-channel audio amplifier 111 and speakers 112 connected to the audio amplifier 111. When system 100 is installed, a calibration procedure is implemented to determine the precise positions of speakers 112 in a room coordinate system. Typically, one corner of the room will be designated the origin with x and y extending along two straight walls and z up from the floor. And speaker locations are programmed into audio processor 120. The present invention uses the one or more speakers 112 to broadcast a sound signal and a sound masking signal. The sound masking signal also carries a communication signal.

In accordance with the present invention, audio processor 120 is used for real-time processing of audio signals from microphone array 130, local network 140, and external network 150. Details of the audio processor 120 are shown in FIG. 2.

One or more microphones 131 may be placed into various locations in the room to form microphone array 130. When the location of a microphone 131 changes, audio processor 120 automatically recalculates the position of the microphone 131 by recording the delay from each speaker 112 to each microphone 131.

Signals input to audio processor 120 are processed and output to audio amplifier 110, local network 140, and external network 150. Local network 140 may include a wireless access point 141 (AP) that communicates wirelessly with one or more devices 142, such as a mobile device 142a and a computer 142b. Audio processor 120 may include two Ethernet ports that sit between AP 141 that are servicing local network 140 and external network 150.

The external network 150 includes all connected networks (i.e. local area networks, intranets and the internet) outside of the area served by access point 141. Remote participants may connect to audio system 100 through external network 150 and are considered additional input and output audio sources for audio system 100.

With reference to FIG. 2, audio processor 120 is described in more detail hereinafter. Audio processor 120 includes at least one echo canceller 121, packet filter 122, at least one analog to digital converter 123 (ADC), at least one digital to analog converter 124 (DAC), a voltage controlled oscillator 125 (VCXO) and audio digital signal processor 126 (DSP).

Each echo canceller 121 is used to suppress undesirable sounds by taking a copy of an original sound wave output to each speaker 112, a signal from microphone array 130, and the measured impulse response from the impulse response extractor 1262 (described in FIG. 5) between each speaker 112 and each microphone 131. Echo canceller 121 is described in more detail with reference to FIG. 3.

Packet filter 122 is used to improve data transmission it and is further described with reference to FIG. 4. VCXO 125 generates a sample clock which is used to synchronize timing signals throughout the system. The remaining processing functionalities required by the audio processor are completed by DSP 126 and further described with reference to FIG. 5.

Audio processor 120 recovers the impulse response from each speaker 112 to each microphone 131 in the room and implements a separate echo canceller for each. Details of echo canceller 121 for each microphone 131 in microphone array 130 are described with reference to FIG. 3.

With reference to echo canceller 121, a copy of the signal that is output from each of speaker 112 is applied to a finite impulse response filter 1211 with coefficients equal to the measured impulse response from the corresponding speaker 112 to the corresponding microphone 131 (as described below with respect to impulse response extractor 1262). This produces an estimated signal of what the microphone should have received from the speaker 112. The estimated signals from each speaker 112 are subtracted from the microphone signal 131 to prevent the speaker output from echoing back to the source.

Packet filter 122 is shown and described with reference to FIG. 4. Packet filter 122 includes a sorter 1221, a gate 1222, and a multiplexer MUX 1223, and may be used to sort packets from local network 140, external network 150, and DSP 126. Packets are sorted into packets for DSP 126 and placed in the audio queue 1224, high priority packets are placed into high priority queue 1226, and low priority packets are placed into low priority queue 1225 using sorter 1221. High priority packets are identified with the appropriate Ethernet 802.1Q or DSCP tags wherein other packets are generally considered low priority packets.

MUX 1223 is used to rank packets output from each port such that DSP 126 packets from the audio output queue 1227 have the highest priority. Packets in the high priority queue 1226 are subsequent in ranking and packets in the low priority queue 1225 are lowest in ranking.

Packet filter 122 may optimize the use of the external network by gating non-critical packets. Gate 1222 is closed periodically to stop packets from going through to reduce the bandwidth of low priority packets. Gating low priority packets 1225 allows for moving the choke point away from the local network 140. Gate 1222 is used to keep the network utilization below a maximum level by gating low priority packets that use the system. This is important because latency increases as networks get close to full load.

To keep the network utilization below a maximum, the low-priority packets are gated by gate 1222, allowing for the total network usage to be below the set percentage. TCP connections going through gate 1222 automatically slow down to a more appropriate rate and the choke point for the network becomes low-priority queues allowing for improvements to the local audio quality.

With reference to FIG. 5, DSP 126 shown in FIG. 2 is described in more detail. DSP 126 includes sound mask noise generator 1261, impulse response extractor 1262, microphone locator 1263, timing generator 1264, network interface 1265, sound controller 1266, phased array 1267, and audio mixer 1268. Details of phased array 1267 and audio mixer 1268 are further described in FIGS. 6 and 7, respectively.

Sound masking is a technique that artificially raises the acoustic noise floor in a space in order to mask unwanted sounds. Sound mask noise generator 1261 generates a repetitive pseudo-noise signal similar to natural background noise (commonly referred to as a "pink noise" spectrum) but has properties that allow the impulse responses and data from each of the speakers 112 to be recovered.

The sound mask starts as a pseudo-random white noise signal generated by adding 8192 equal amplitude and equally spaced sine waves with uniformly distributed random phases. The sample rate is 48 kHz and the frequency spacing between sine waves is exactly (24000/8192) Hz, which gives a periodic signal of exactly 16,384 samples. The white noise is then converted into the pink noise spectrum of a typical sound mask signal by applying a band-pass filter.

This repetitive signal is not suitable as a sound mask because its short repetition period (341 ms) is detectable by the ear and sounds unnatural. Therefore, the sound mask signal is changed to a new sound mask signal with a different set of random phases every 500 ms and repeats for 16 cycles (8 seconds) before returning to the original pattern. This allows a repetition period that prevents patterns being detected by the ear.

The ear may pick up sound mask signals from nearby speakers as patterns change as the user moves if the signals are correlated. Therefore, these sounds may also be unnatural to the ear. To reduce correlation, sound mask signals coming from adjacent speakers are of the same type, but have different pseudo-random phase patterns. Given the example, there would be 16 different sets of patterns. If there are more than 16 speakers in the system, speakers using the same pattern are placed as far apart as possible. The data for the pseudo-random phases used by the 256 symbols (16 symbols×16 speaker channels) comes from a deterministic random number generator with a fixed seed so both the transmitter and the receiver will have the same set of scrambling phases.

To reduce cross correlation between sound mask signals from speakers 112, the 16 symbol set is repeated 16 times in a 256 symbol (128 second) frame. Each set of 16 symbols is multiplied by the corresponding element of one row of the 16×16 Walsh-Hadamard matrix, and each speaker uses a different row. At the receiver, each set of 16 symbols is again multiplied by the corresponding element in the matrix to undo the action.

Each set of up to 16 speakers will broadcast a 32-bit system identification number from each speaker every 8 seconds. This number identifies the system that the remote device 142 is communicating with and, together with the channel number, identifies which specific speaker the sound in coming from. Data is encoded using pulse position modulation (PPM) on the odd symbols (1, 3, 5, . . . 15) of the 16 symbol set. The even symbols (0, 2, 4 . . . 14) are unmodulated and used for reference. Each of the odd symbols rotates its repetitive signal by a in each of the odd symbols.

Device 142 located within the room comprising the speakers 112 (and in communication with local network 140) receiving the noise mask signal through its microphone must first recover the system identification number before it can recover impulse responses. The receiver averages the reference symbols to recover an unmodulated reference signal. It then correlates the reference signal with each of the odd symbols. A large correlation spike should occur at the time offset that represents the data that was sent. Once the receiver has recovered all 8 of the odd symbols from at least one of the speakers, it can construct the full 32-bit system ID. Once the system ID is known, the device 142 recovers the impulse response from each speaker to itself using the same method as the audio DSP's impulse response extractor 1262 (as described hereinafter).

The impulse response of a channel is a plot of amplitude verses delay that describes all the echoes in the acoustic channel. The plot should be zero until the delay of the first response (normally the direct path from speaker to microphone) and then will show other pulses for reflected signals from walls and objects in the environment with longer delays.

The original sound wave from each speaker may be transmitted to the devices 142 through a local network (for example WiFi) and preferably prior to broadcasting the signal through the speaker. The sound wave may be used to implement an echo canceller within the mobile device to remove unwanted speaker signals from the microphone input.

For sound enhancement, the original sound wave signal is used with a headset, Bluetooth ear piece, or Bluetooth hearing aid connected to the mobile device. If sent directly to the user's ear, the sound may not be synchronized with the signal arriving at the user's ear through the air, and the user may hear the same sound twice (once through the air and once through the enhancement). By convolving with the impulse responses measured between the speakers and the device, the timing of the enhanced signal would align better with the signal arriving at the user's ear through the air.

The method of extracting the impulse response using an impulse response extractor 1262 will be described in more detail herein after. To recover the impulse response from the noise mask signal, the receiver extracts one cycle (16,384 samples) from one of the 500 ms symbols and applies a fast Fourier transform (FFT) to extract the amplitude and phase of each of the component sinusoids.

The receiver then applies the opposite of the phase that was used to generate the white noise to each sine wave frequency. An inverse FFT is then applied to recover the desired impulse response. If the extracted symbol was from a reference (even) symbol, then it will appear with a zero time offset. If it is extracted from a data (odd) symbol, then it will be offset by the data bits and that rotation will need to be inverted. If the extraction of the impulse response is performed on the transmitting signal, the result will be the frequency response of the pink-noise filter. If extraction of the impulse response is performed on the signal received by the microphone, which includes the impulse response of the audio channel, then the resulting impulse response would include all of the audio channel echoes. This method is repeated for each signal between each microphone (m) and each speaker (s) to produce a set of impulse responses, $h_{m,s}(n)$, that represent the combinations.

Uncorrelated sounds from the room (voices, fans, HVAC noise, etc.) are added randomly and averaged to a very small signal over time. Signals from adjacent speakers create cross-correlation noise that are reduced by averaging over the 16 different patterns in the set. Furthermore, since the same pattern set is repeated every 8 s, further averaging may not reduce the interference signal. Application of the Walsh-Hadamard over the 256 symbol frame eliminates this problem over the long term. Since all rows in the Walsh-Hadamard matrix are orthogonal to all other rows, this action will eliminate the residual cross-correlation noise. Over the long term, interference from adjacent speakers will average out to a very low level.

Microphones within system 100 are found using microphone locator 1263. Devices 142 first find the system identification number and decode the number from the noise mask signal. Device 142 then searches local network 140 for an audio system matching the decoded number. Sound controller 1266 responds to the search packets with more detailed information including the active speaker channels, the location of those speakers in room coordinates, and the temperature of the room.

Microphone locator 1263 determines the position of each microphone within system 100 using trilateration. From each speaker 112 that the microphone can hear, the system extracts the delay to the first echo in the impulse response, which it assumes to be the direct path. Based on the known positions of the speakers 112 and the speed of sound, the system calculates the expected delays from each speaker 112 to an estimated microphone location (x,y,z). It then compares the expected delays to the measured delays and generates a mean-square error. This is applied to a numerical optimization routine to find the (x,y,z) microphone position with the smallest mean-square error which is reported as the actual microphone location. Trilateration requires signals from at least three speakers but improves with more.

When there are possible synchronization errors or unknown delays through the system 100, timing generator 1264 is used to add extra term, $\Delta t$, to represent the unknown time offset. In this case, the optimization routine uses four variables $(x,y,z,\Delta t)$ with at least four speakers 112.

Devices 142 in system 100 are synchronized to coordinated universal time (UTC) either by NTP (network time protocol) through the internet, or through a GPS receiver. Receivers that are not synchronized with UTC may detect the sound by sampling a 128 s sequence and searching for codes that match and can take a significantly longer time. The first symbol of the 128 s (256 symbol) frame starts transmitting at 00:00:00.0 UTC each day and the frame is repeated exactly 675 times each day. Adjustments are made to VCXO 125 to keep audio processor 120 synchronized. Symbols transmitted during leap seconds are ignored by the receiver. The modulation scheme allows for a timing error of up to 33 ms without interference.

In order to prevent intersymbol interference, the 500 ms symbol is organized into a preamble consisting of the last 6000 samples of the cycle, one full 16384 sample active cycle, and a tail consisting of the first 1616 samples of the cycle. The 125 ms preamble section is an inert signal whose purpose is to let echoes from the previous symbol die out before sampling the active section.

Sound controller 1266 is used to adjust the parameters of the DSP 126 to account for user requests, network load, and room layout. Sound controller 1266 controls the volume of the sound mask signal output by the sound mask noise generator 1261, controls the timing of the local network 140 using the gate signal output by the timing generator 1264, controls delays ($D_{M,N}$) and weights ($W_{M,N}$) to the phased array 1267, and controls weights ($M_{R,Q}$) to the audio mixer 1268. Furthermore, sound controller 1266 receives packets from the network interface 1265 that contain control messages for user requests and network statistics.

Phased array 1267 will be described in more detail with reference to FIG. 6. Phased array 1267 equalizes delays to each device 142 in local network 140 by inserting the time delay from each microphone 131 in microphone array 130.

Suppose there is a room with a large number of microphones: ceiling mics, desk mics, and personal devices. If someone wants to hear something from a specific location, they may take their device 142 and move their virtual listening point to where they want to be. Participants may send control messages to the sound controller 1266 to identify the specific location of listening and speaking within the space. The sound controller 1266 will translate these messages into the necessary parameters for DSP 126. In the present invention, multiple microphones are made as array 130 to enhance the sound by exploiting the position information already known.

The indoor positioning system (IPS) includes calculating a time delay to insert into each microphone of the microphone array by determining where each microphone is in relation to the meeting room. By knowing where each microphones is in relation to the room, the desirable delay at the specific location can be equalized.

When the participant (either in the room or connecting through external network 150) specifies which point in space that they want to listen from, the present invention may search around that point to a maximum radius for the strongest signal out of the array. The signal booster increases the strongest signal within the participant defined area by determining the maximum amplitude output from microphone array 130.

Optional features include using a stereo camera to define and link the sound location for a virtual microphone using various methods of identification such as face tracking. The participant may click on the camera image, and the system may throw the virtual microphone to that point in 3D space. Face tracking is an optional element and may be used to track the person. The system may be self-calibrating by placing an LED on each microphone that blinks to identity the location of the microphone in the camera image. Furthermore, the system may automatically adjust to microphones and cameras with a change in location.

With reference to FIG. 7, the audio mixer 1268 creates up to R mixed signals from Q inputs, with a separate weight given from each input to each output. The inputs include echo cancelled microphone signals, phase array microphone signals, network audio sources, and auxiliary inputs. Outputs include the room speakers and devices on the local and external networks.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

The invention claimed is:

1. A method for mapping out and maintaining a dynamic combined microphone array comprising:
    obtaining real-time impulse responses from speakers, wherein speaker locations are predetermined by performing calibrations;
    calculating propagation delays from the speakers in real-time based on the determined speaker locations;
    establishing a plurality of microphone locations in three-dimensional (3D) space by using the calculated propagation delays from the real-time impulse responses to form a dynamically adaptable combined microphone array, wherein the microphone array is configured to focus the microphones on desired sound and to take the focus of the microphones away from undesired sound.

2. The method of claim 1 further comprising:
    comparing the calculated propagation delays to measured delays to generate a mean-square error; and
    finding each microphone location with the smallest mean-square error through a numerical optimization routine to establish the plurality of microphone locations in the 3D space.

3. The method of claim 2 wherein the measured delays are obtained by extracting delays to the first echoes in the impulse responses.

4. The method of claim 1 wherein the propagation delay to each microphone from the speakers is calculated based on at least three speaker locations.

5. The method of claim 1 wherein the speakers are configured to output sound signals comprising a sound mask noise signal with embedded additional information.

6. The method of claim 5 wherein the impulse responses are derived between each speaker and each microphone in real time based on the embedded additional information.

7. The method of claim 5 wherein the embedded additional information comprises system identification.

8. The method of claim 5 further comprising generating sound mask noise signal that comprises a plurality of non-interfering orthogonal sound mask signals.

9. The method of claim 5 wherein the sound mask noise signal comprises a plurality of unique speaker-specific pseudo-random phase shifted waves with the embedded additional information.

10. A system for mapping out and maintaining a dynamic combined microphone array, comprising:
    a plurality of speakers configured to output sound signals comprising a sound mask noise signal with an embedded additional information, wherein locations of the speakers are predetermined by performing calibrations;
    a plurality of microphones configured to receive the sound signals comprising the sound mask noise signal from the plurality of speakers; and
    a processor configured to:
        obtain real-time impulse responses from the speakers;
        calculate propagation delays from the speakers in real-time based on the determined locations of the speakers;
        establish locations of the microphones in three-dimensional (3D) space by using the calculated propagation delays from the real-time impulse responses to form a dynamically adaptable combined microphone array, wherein the microphone array is configured to focus the microphones on desired sound and to take the focus of the microphones away from undesired sound.

11. The system of claim 10 wherein the processor is further configured to:
compare the calculated propagation delays to measured delays to generate a mean-square error; and
find a location of each microphone with the smallest mean-square error through a numerical optimization routine to establish locations of the microphones in the 3D space.

12. The system of claim 11 wherein the measured delays are obtained by extracting delays to the first echoes in the impulse responses.

13. The system of claim 10 wherein the propagation delay to each microphone from the speakers is calculated based on at least three speakers.

14. The system of claim 10 wherein the impulse responses is derived between each speaker and each microphone in real time based on the embedded additional information.

15. The system of claim 10 wherein the embedded additional information comprises system identification.

16. The system of claim 10 wherein the processor is configured to generate the sound mask noise signal that comprises a plurality of non-interfering orthogonal sound mask signals.

17. The system of claim 10 wherein the sound mask noise signal comprises a plurality of unique speaker-specific pseudo-random phase shifted waves with the embedded additional information.

* * * * *